US011042752B2

(12) United States Patent
Perakslis et al.

(10) Patent No.: US 11,042,752 B2
(45) Date of Patent: *Jun. 22, 2021

(54) ALIGNING ADVERTISEMENTS IN VIDEO STREAMS

(71) Applicant: Verizon Patent and Licensing Inc., Basking Ridge, NJ (US)

(72) Inventors: Mark S. Perakslis, Franklin, MA (US); Earl W. Vanderhoff, Cranston, RI (US); David E. Dubois, Sturbridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,286

(22) Filed: Jun. 26, 2020

(65) Prior Publication Data

US 2020/0327331 A1     Oct. 15, 2020

Related U.S. Application Data

(63) Continuation of application No. 15/654,758, filed on Jul. 20, 2017, now Pat. No. 10,726,269.

(51) Int. Cl.
*G06K 9/00* (2006.01)
*H04N 21/234* (2011.01)
*H04L 29/06* (2006.01)

(52) U.S. Cl.
CPC ...... *G06K 9/00711* (2013.01); *H04L 65/4069* (2013.01); *H04L 65/4092* (2013.01); *H04L 65/607* (2013.01); *H04L 65/608* (2013.01); *H04N 21/234* (2013.01); *H04N 21/23406* (2013.01); *H04N 21/23418* (2013.01)

(58) Field of Classification Search
CPC ............. G06K 9/00711; H04N 21/234; H04N 21/23418; H04N 21/23406; H04N 21/812; H04L 65/4092; H04L 65/607; H04L 65/608; H04L 65/4069; G06Q 30/0242

See application file for complete search history.

(56) References Cited

U.S. PATENT DOCUMENTS

| 8,312,495 | B2 | 11/2012 | Vanderhoff |
| 8,595,784 | B2 | 11/2013 | Vanderhoff et al. |
| 9,161,074 | B2 | 10/2015 | Khader et al. |
| 9,230,173 | B2 | 1/2016 | Vanderhoff |
| 9,230,188 | B2 | 1/2016 | Vanderhoff |
| 2004/0025176 | A1 | 2/2004 | Franklin et al. |
| 2006/0101486 | A1 | 5/2006 | Kar et al. |
| 2006/0187358 | A1 | 8/2006 | Lienhart et al. |
| 2009/0285551 | A1 | 11/2009 | Berry |
| 2011/0261257 | A1 | 10/2011 | Terry et al. |
| 2012/0254913 | A1 | 10/2012 | Di Mattia et al. |
| 2013/0039587 | A1 | 2/2013 | Zhang et al. |

(Continued)

Primary Examiner — Fernando Alcon (57) ABSTRACT

A system may receive a first video stream from a first source over a network; receive a second video stream from a second source over the network; store a first portion of the first video stream in a first first-in-first-out (FIFO) buffer; store a second portion of the second video stream in a second FIFO buffer; compare the first portion of the first video stream to the second portion of the second video stream; detect an advertisement and features in the first video stream based on the comparing; and analyze the advertisement to identify one or more types of anomalies in the advertisement based on the detected features.

20 Claims, 8 Drawing Sheets

(56) References Cited

U.S. PATENT DOCUMENTS

| | | |
|---|---|---|
| 2014/0173650 A1 | 6/2014 | Mathews et al. |
| 2014/0282722 A1 | 9/2014 | Kummer et al. |
| 2016/0182922 A1 | 6/2016 | Fonseca et al. |
| 2016/0350173 A1 | 12/2016 | Ahad |
| 2018/0192093 A1 | 7/2018 | Loheide et al. |
| 2019/0260969 A1 | 8/2019 | Tzoukermann et al. |
| 2019/0266632 A1 | 8/2019 | Milford et al. |
| 2019/0342594 A1 | 11/2019 | Korte et al. |

ALIGNING ADVERTISEMENTS IN VIDEO STREAMS

CROSS REFERENCE TO RELATED APPLICATION

This patent application claims priority to and is a continuation of U.S. patent application Ser. No. 15/654,758, filed on Jul. 20, 2017, titled "Aligning Advertisements in Video Streams," the disclosure of which is incorporated by reference herein in its entirety.

BACKGROUND

Digital cable video typically originates from a content provider. Prior to receipt by a content deliverer, video may experience a commercial ad insertion, may be processed with station identification video overlays, may become encrypted, and then may be multiplexed into transport streams and/or packetized for transmission across terrestrial, wireless, or satellite networks. Once received by a content deliverer, additional processes may be applied. Such processes may include decryption, transcoding, rate-shaping/grooming, re-multiplexing, segmentation, encryption, re-packetizing, regional ad insertion, etc.

DETAILED DESCRIPTION OF PREFERRED EMBODIMENTS

The following detailed description refers to the accompanying drawings. The same reference numbers in different drawings may identify the same or similar elements.

Processes that are applied to a video before and after it is received by a content deliverer typically runs on independent clocks, and utilize relatively large input buffers that often store a video for several seconds. This results in delays to the program stream. These delays change dynamically and often dramatically (by factors greater than 100%); based upon the demands of the content stream or video payload, network conditions, and the instantaneous states of the processing equipment.

Accordingly, determining the precise delay incurred at each processing stage in real-time, across hundreds/thousands of miles, differing corporate networks, diverse equipment, and unique architectures—is essentially impossible. In turn, this renders a precise placement of commercial advertisements downstream in digital video difficult.

Ad insertion for analog video can be comparatively simple. Ads can be cued from audio tones embedded in the vertical blanking interval (VBI) portion of the video signal. Regardless of analog format, the cues remain embedded within the video through all subsequent processing and can be registered and used at any point downstream—and switching to an advertisement can be completed in less time than required for a single new frame of video to be received.

In contrast, digital video processing "scrubs" or removes most forms of external signaling. Each processing stage potentially removes or alters a portion of the original signal. Most digital compression or processing does not typically seek to preserve any of the original digital "packaging", so embedded digital signals or cues are typically lost during such processes in the interest of compression or transmission efficiency.

In digital video processing, the splicer or multiplexer used to insert ad content is often placed downstream of the program reception. The effects may include at least: (1) cues read at the reception point would be invalidated by the cumulative, dynamically changing delays; and (2) no cue would remain in the stream to be read at the point of insertion unless regenerated after processing.

Although there are standards associated with video processing (e.g., SCTE30 and 35), these are inadequate for addressing cue scrubbing and dynamic latencies in all but the simplest of video processing architectures. Many cable companies in the U.S. employ a team of technicians in a continuous schedule to monitor and adjust for regional ad insertion timing. For example, one company has been dedicating greater than 13,000 man-hours per annum for this single task. The huge man-power investment may be due to several factors.

One factor is that ad insertion is a queued process. There are no set times for ad commencement. A technician must monitor the video beginning a few minutes before he/she believes the ad will start to guarantee that the insertion position is not missed. Another factor is that a technician can only view one ad from one program channel, in one demographic marketing area (DMA) at a time.

Yet another factor may be that each channel must be independently adjusted to compensate for unique processing equipment/architectures and differences in the time registered between the content provider (e.g., television network) and regional provider (e.g., cable system) equipment times. There is no shared network time server between diverse program providers. Still, yet another factor may be that variables encountered during de-packaging of video transport and elementary streams (e.g., Program Time Stamp arrival (PTS), Program Allocation Table arrival (PAT), and Group of Pictures (GOP) arrival, etc.) render the result of any single test somewhat moot.

In view of the above, systems and methods described herein reduce tasks that are associated with monitoring video advertisements. The systems and method may use network video sources and set-top-boxes (STB) video control, to eliminate travel and on-site requirements. In addition, the system and method may provide for automated detection of diverse advertisements via real-time referenced video analysis using two or more videos (e.g., a content provider video stream and regional/locally ad-inserted video streams).

The system and method may provide for recording of each source video before, during and after diverse advertising periods of programming from each source to enable forensic analysis. The system may allow a user to access a side-by-side, temporally synchronized display venue for manual verification of results. The system may provide simple video recognition analysis algorithms to automatically verify that the correct ad has been played. The algorithms may include simple pattern-recognition and analysis algorithms to automatically verify correct timing, such as ad starts, stops and durations.

The system and method may provide precise timing adjustment recommendations, and the facility to easily verify them. Manpower requirements for the content deliverer maybe reduced to near zero, while increasing the effectiveness of monitoring advertisements.

Figure 1:
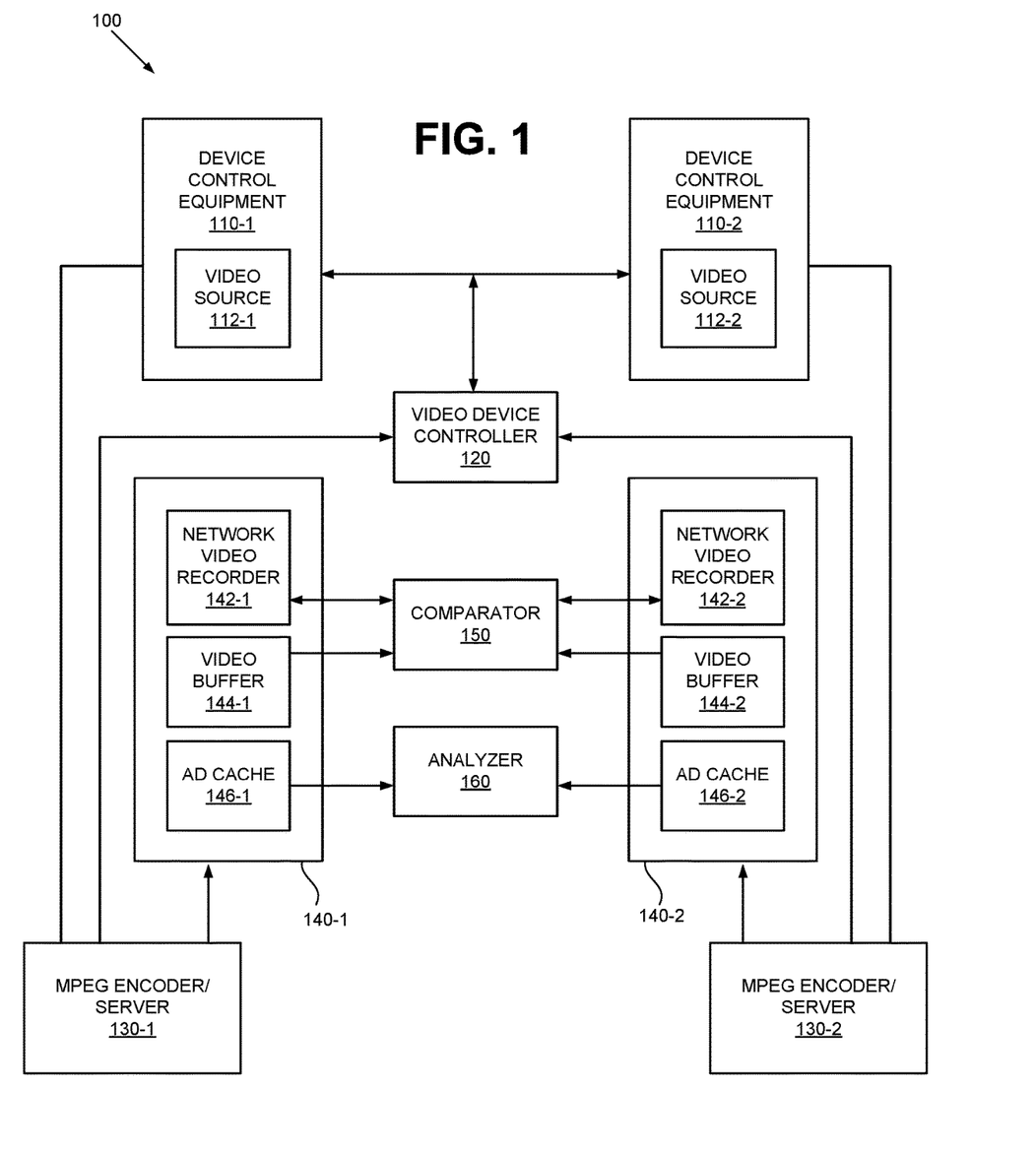
FIG. 1 illustrates an exemplary network in which concepts described herein may be implemented.

FIG. 1 illustrates exemplary network 100 in which concepts described herein may be implemented. Network 100 may include one or more networks capable of exchanging digital or analog data, such as voice, video, documents, multimedia, text, etc. For example, the networks may include one or more public switched telephone networks (PSTNs), one or more wireless public land mobile networks (PLMNs), or another types of networks.

The PLMN(s) may include a Code Division Multiple Access (CDMA) 2000 PLMN, Global System for Mobile Communications (GSM) PLMN, Long Term Evolution (LTE) PLMN and/or other types of PLMNs not specifically described herein. The network may include Packet data network (PDN) that supports Internet Protocol (IP)-based communications. The PDN may include, for example, an IP Multimedia Subsystem (IMS) network, which may provide voice and multimedia services to user devices based on Session Initiation Protocol (SIP).

Network 100 may also include networks with a number of transmission towers for receiving wireless signals and forwarding the signals toward the intended destination. The networks may further include one or more packet switched networks, such as a local area network (LAN), a wide area network (WAN), a personal area network (PAN), an intranet, the Internet, or another type of network that is capable of exchanging information.

As shown in FIG. 1, network 100 may include device control equipment 110-1 and 110-2, video sources 112-1 and 112-2, a video controller 120, a Moving Pictures Experts Group (MPEG) encoders 130-1 and 130-2, recorders 140-1 and 140-2, comparator 150, and analyzer 160. Each pair of components 110-1 and 110-2, 112-1 and 112-2, 130-1 and 130-2, 140-1 and 140-2, may be collectively referred to by labels 110, 112, 130, and 140.

Device control equipment 110 may be co-located with video equipment and may include networked servers, infrared servers, RS232 terminal servers, networked closed-contact servers, Bluetooth servers, video scalers, converters, etc. Device control equipment 110 may control and/or manipulate video equipment, such as video source 112. Device control equipment 110 may receive control signals from video device controller 120, and manipulate video source 112 in accordance with the signals.

Video source 112 may include a source of video streams. Video source 112 may include, for example, a set-top box, demultiplexer, Internet Group Management Protocol Join devices, etc.

Each of video sources 112 may provide a video stream. One of the sources (e.g., 112-1) may include an "original" video, and the other sources (e.g., 112-2) may include streams after local/regional ad insertions. Alternatively, each source may include/provide a stream after local/regional ad insertions, where ad programming is unique to each stream. Sources 112 may originate from, but are not limited to, cable television (CATV), satellite, or terrestrial digital receivers, cabled radio frequency (RF) feeds, optical and/or internet protocol (IP) networks, etc.

Video device controller 120 may send control signals for manipulating video source 112 to device control equipment 110.

MPEG encoder/network server 130 may receive video streams from each source 112 and may make each video stream remotely available. In some implementations, MPEG encoder 130 may provide the video streams to recorder 140.

Each recorder 140 may continuously buffer a video stream that it receives and may make the contents of its buffer available to a video comparator 150. In one implementation, each buffer is initially First-In/First-Out (FIFO) and may be sufficient in size to store several minutes of video.

As further shown in FIG. 1, recorder 140 may include a network video recorder 142, video buffer 144 and ad cache 146. Recorder 142 may include control mechanisms for recorder 140. Video buffer 144 may temporarily store a received video; and ad cache 146 more permanently dedicate storage for ad video, identified by comparator 150, in the video.

For ad identification, recorder 140 receives a signal designating the start of an ad detected by and communicated from comparator 150. In some implementations, when recorder 140 receives the communication, recorder 142 may cease buffering the incoming video in the First-In/First-Out scheme and capture the video only until several seconds after the point communicated by comparator 150 as the detected end of the ad. At this point, recorder 142 may dedicate buffer 144 to general memory/storage, making buffer 144 available for viewing and analyzing video. Thereafter, recorder 142 may recommence FIFO buffering video (using the buffer) to facilitate continued ad detection and recording.

Comparator 150 may synchronize two videos in buffers 144 in recorder 140 to compensate for differences in latency and compare the two videos for uniqueness. Comparator 150 may determine that the starting point of different content, of sufficient duration, in a video stream marks the commencement of a regional/local ad. The recovery of the continuous content may indicate the end of an ad.

Analyzer 160 may access stored ads (either transferred from ad cache 146 or at ad cache 146) for side-by-side forensic display. Analyzer 160 may also playback recorded video/ads from recorders 140 in a side-by-side, frame-by-frame synchronized fashion.

Analyzer 160 may also perform an automated ad analysis of each detected ad and trending analysis for all captured ads. In performing analysis, analyzer 160 may detect various conditions and features related to an ad, as further explained below with respect to FIGS. 3 and 4. In performing its analysis, analyzer 160 may apply processes/functions each of which is designed to identify and associate ad content with a referenced video/audio source. The processes/functions may determine gradated differences between a reference video and another video.

Analyzer 160 may further analyze timing discrepancies in the ad insertions. For example, for each ad, analyzer 160 may determine: temporal adjustments necessary for a proper ad placement; whether the correct ad is played; and whether video quality and audio quality are acceptable.

Analyzer 160 may perform automated (or with manual intervention) analyses for several ads, to isolate trends and consistencies. Based on the analyses, analyzer 160 may generate alerts and alarms, with recommendations regarding insertion timing corrections.

Depending on the implementation, network 100 may include additional, fewer, different, or a different arrangement of components than those illustrated in FIG. 1. For example, many of the components in FIG. 1 may be instantiated as a single integrated device or a combination of hardware devices and applications, allowing the system to scale. In addition, network 100 may include additional video sources, comparators, controllers, analyzers, recorders, etc.

Figure 2:
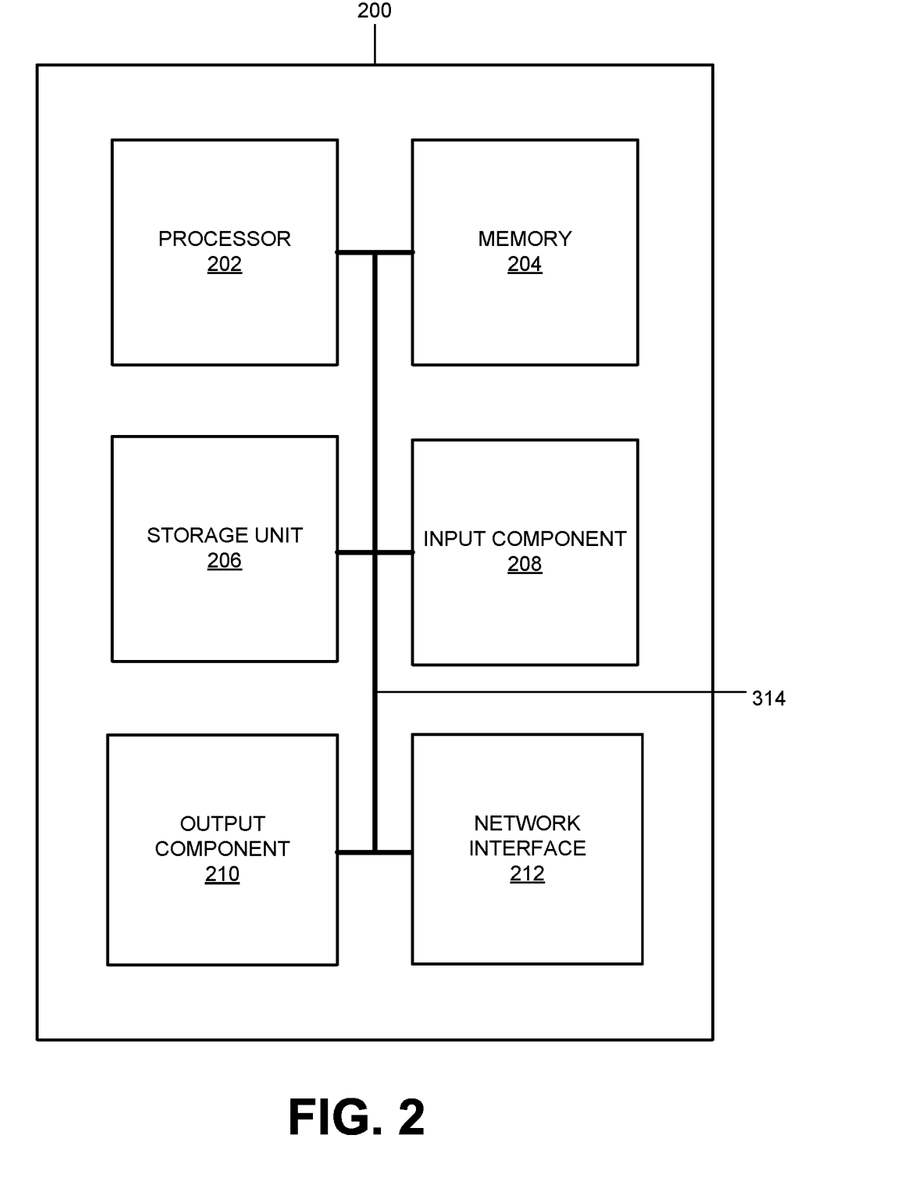
FIG. 2 illustrates exemplary components of the network devices of FIG. 1.

FIG. 2 is a block diagram of exemplary components of a network device 200. Network device 200 may be included in any of the devices and/or components illustrated in FIG. FIG. 1. For example, components 110-160 may include one or more network devices 200 (e.g., in the form of set-top boxes, servers, video recorders, personal computers, etc.).

As shown, network device 200 may include a processor 202, memory 204, storage unit 206, input component 208, output component 210, network interface 212, and communication path 214. In different implementations, network device 200 may include additional, fewer, different, or different arrangement of components than the ones illustrated in FIG. 2. For example, network device 200 may include line cards, modems, infra-red sensors, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 200 and/or executing programs/instructions.

Memory 204 may include static memory, such as read only memory (ROM), and/or dynamic memory, such as random access memory (RAM), or onboard cache, for storing data and machine-readable instructions (e.g., programs, scripts, etc.).

Storage unit 206 may include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Storage unit 206 may be external to and/or removable from network device 200. Storage unit 206 may include, for example, a Universal Serial Bus (USB) memory stick, a dongle, a hard disk, off-line storage, a Blu-Ray® disk (BD), etc. Storage unit 206 may store data, a copy of software, an operating system, application, and/or instructions.

Depending on the context, the term "memory," "storage," "storage device," "storage unit," and/or "medium" may be used interchangeably. For example, a "computer-readable storage device" or "computer-readable medium" may refer to both a memory and/or storage device. Furthermore, in some implementations, device 200 may include non-volatile storage device that also operates as memory (e.g., Intel's Optane™).

Input component 208 and output component 210 may provide input and output from/to a user to/from device 200. Input/output components 208 and 210 may include a display screen, a keyboard, a mouse, a speaker, a microphone, a camera, a DVD reader, USB lines, and/or other types of components for obtaining, from physical events or phenomena, to and/or from signals that pertain to device 200.

Network interface 212 may include a transceiver (e.g., a transmitter and a receiver) for network device 200 to communicate with other devices and/or systems. For example, via network interface 212, network device 200 may communicate over a network, such as the Internet, an intranet, a terrestrial wireless network (e.g., a LTE, WLAN, WiFi, WiMax, etc.), a satellite-based network, optical network, etc. Network interface 212 may include a modem, an Ethernet interface to a LAN, and/or an interface/connection for connecting device 200 to other devices (e.g., a Bluetooth® interface).

Communication path 314 may provide an interface through which components of device 200 can communicate with one another.

Network device 200 may perform the operations described herein in response to processor 202 executing software instructions stored in a non-transient computer-readable medium, such as memory 204 or storage unit 206. The software instructions may be read into memory 204 from another computer-readable medium or from another device via network interface 212. The software instructions stored in memory 204 or storage unit 206, when executed by processor 202, may cause processor 202 to perform processes that are described herein.

For example, analyzer 160 may include network devices 200 (or is implemented over network devices 200). In such instances, the programs on analyzer 160 may receive ads from recorder 140. In another example, recorder 140 may cache or buffer videos and ads in storage units 206.

Figure 3:
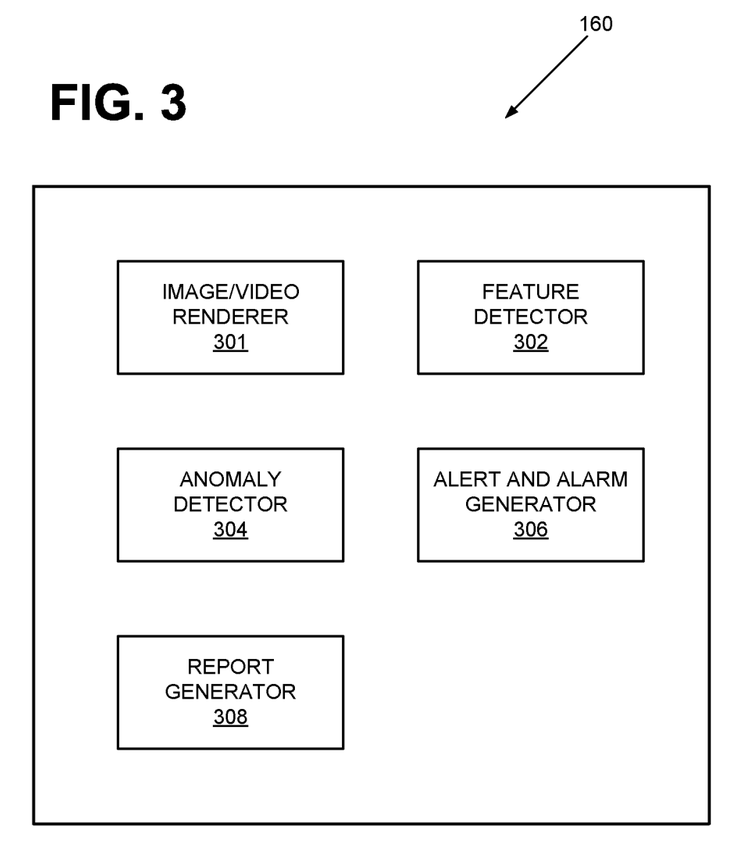
FIG. 3 illustrates exemplary functional components of the exemplary analyzer of FIG. 1.

FIG. 3 illustrates exemplary functional components of analyzer 160. As shown, Analyzer 160 may include image/video renderer 301, feature detector 302, anomaly detector 304, alert and alarm generator 306, and report generator 308. Depending on the implementation, analyzer 160 may include additional, fewer, and/or different components than those illustrated in FIG. 3.

Image/video renderer 301 may render an image (e.g., a frame) or video and provide the rendered image to a user, via a display. In one implementation, mage/video renderer 301 may display two or more images/videos side-by-side.

Feature detector 302 may examine a video stream and detect one or more frames having particular parameters, images, signals, and/or other characteristics. Feature detector 302 is described in greater detail below with reference to FIG. 4.

Anomaly detector 304 may detect a sequence of video frames that indicate a possible ad timing or placement error.

Alert and alarm generator 306 may receive identified anomalies from anomaly detector 304 and generate alerts provided that there is insufficient data to develop a high confidence that the video sequence is correct; and the disruption described/indicated by the video sequence (if incorrect) would not be noticeable to most viewers; and/or the disruption by the video sequence, if they are an error, would not be considered severe enough to be upsetting to the viewer or to the advertiser.

Alert and alarm generator 306 may also generate an alarm if the identified anomaly is characterized by a high degree of confidence. As used herein, the term "confidence" may refer to a weighted certainty (e.g., likelihood) that any specific hypothesis (or determination) is correct.

Report generator 308 may generate two types of reports: a single video/ad report (e.g., a single interstitial report) and a channel report (e.g., a multi-interstitial report). A report may include a list of alarms and alerts as well as additional information, such as the amount of time to shift a particular ad.

Figure 4:
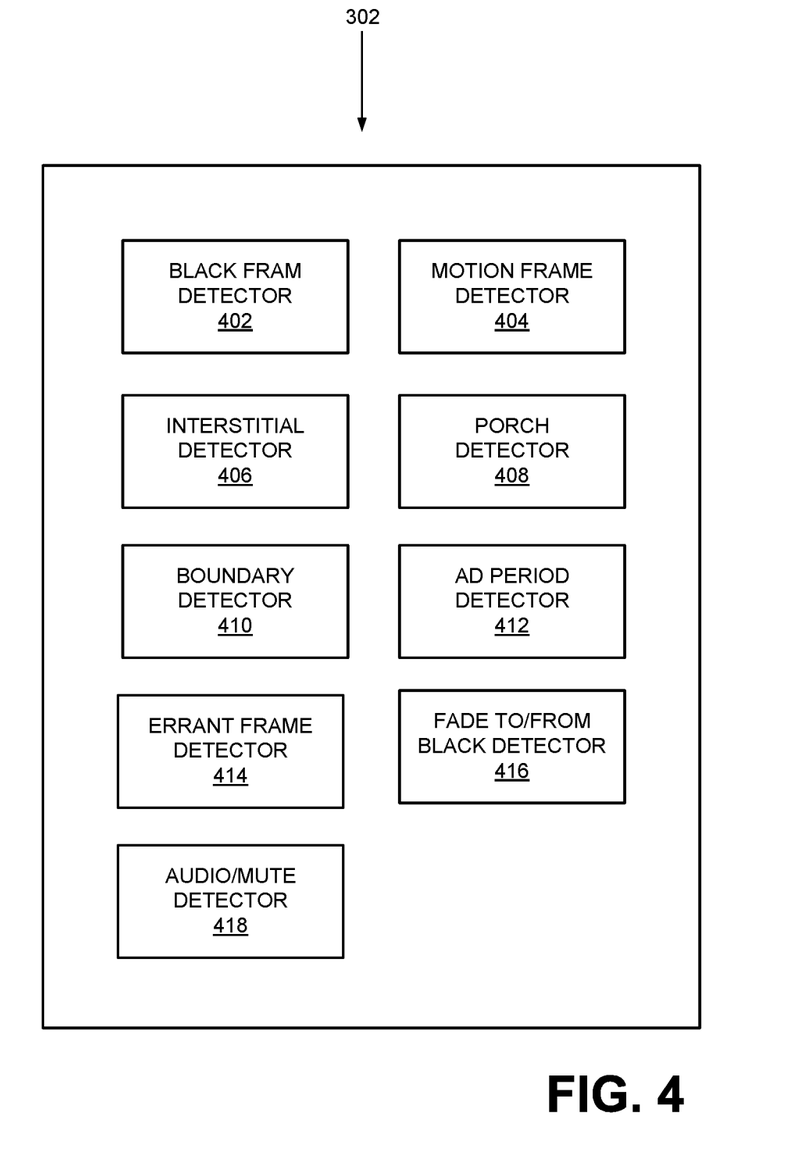
FIG. 4 illustrates an exemplary functional components of the feature detector of FIG. 3 according to one implementation.
Figure 5:
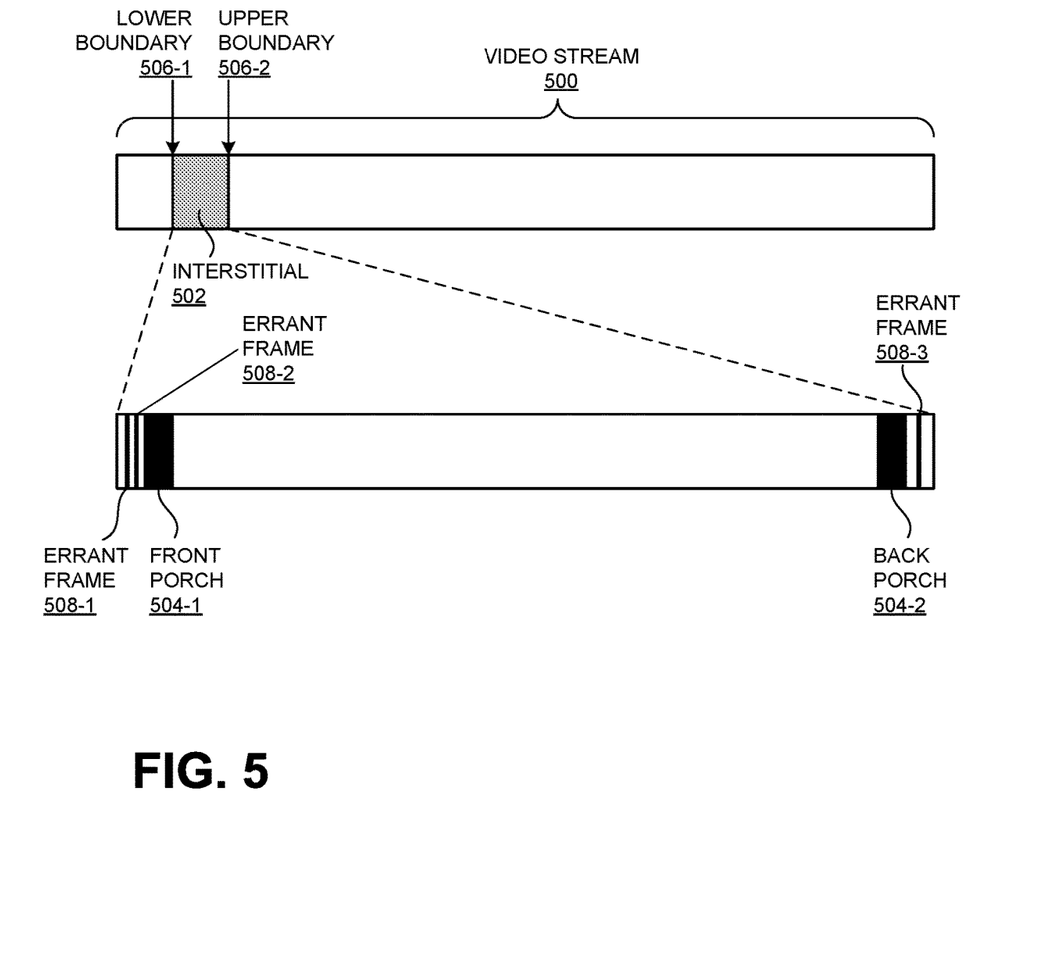
FIG. 5 illustrates different ad portions, of a video stream, that may be detected by the exemplary components of the feature detector of FIGS. 3 and 4.

FIG. 4 illustrates exemplary functional components of feature detector 302. FIG. 5 illustrates different ad portions of a video stream that may be detected by the components of feature detector 302. Referring to FIG. 4, as shown, feature detector 302 may include black frame detector 402, motion frame detector 404, interstitial detector 406, porch detector 408, boundary detector 410, ad period detector 412, errant frame detector 414, fade detector 416, and audio/mute detector 418. Depending on the implementation, feature detector 302 may include additional, fewer, and/or different components than those illustrated in FIG. 4.

Black frame detector 402 may determine a consecutive number of black frames. As used herein, the term "black frame" may refer to any video frame for which the number of adjacent black pixels is below a set threshold.

For the descriptions that follow, computer-generated motion may include a series of still motion images displayed in rapid succession. As used herein, the term "frame" may refer to each of these images. The term frame may also be used as a measure of time, equivalent to the inverse of the video frame rate (e.g., in seconds). For example, National Television System Committee (NTSC) video is produced at a frame rate of 29.97 images (frames) per second (fps). As used herein, the term "content frame" may refer to any non-black video frame, including homogeneous frames with no discrete images, such as all white or all blue images.

Motion frame detector 404 may detect any video frame which demonstrates sufficient mean motion compared to the preceding video frame in a video stream. As used herein, the term "motion" describes the mean difference in luminance values between corresponding pixels (of the same location on the screen) in two adjacent video frames. A homogenous or black frame may be a motion frame if sufficiently different from the preceding frame.

Interstitial detector 406 may detect a temporal interruption in contiguous program content, for facilitating the insertion of advertising, such a pause in programming is referred to herein as an "interstitial." In addition, as used herein, the term "interstitial" may refer to the period in time when video content differs between two referenced sources, as well as the actual content of either source during that period. FIG. 5 illustrates an interstitial 502.

Porch detector 408 may detect a front porch, a back porch, and/or any other porches. As used herein, the term "front porch" may refer to contiguous black frames (if any) occurring without audio immediately preceding the image frames of an interstitial, or possible ad period. Interstitial front porches must appear within a predetermined time duration (e.g., 3 seconds) of the interstitial, otherwise the interstitial is considered to not have a front porch by porch detector 408.

In addition, the term "back porch" or "rear porch" may refer to contiguous black frames (if any), occurring without audio, immediately following the image frames of an interstitial, or possible ad period. Not all ads or interstitials may have front or rear porches. Interstitial back porches must appear within a prescribed time duration (e.g., three seconds) of the interstitial to be considered valid by porch detector 408. FIG. 5 illustrates a front porch 504-1 and a back porch 504-2.

Boundary detector 410 may detect, for an interstitial, an upper boundary and a lower boundary. As used herein, the term "upper boundary" may refer to the end of the interstitial. As used herein, the term "upper boundary" may refer to the first set of non-black, temporally synchronized and matching two video frames of the two video streams being compared.

The term "lower boundary" may refer to the beginning of the interstitial. As used herein, the term "lower boundary" may refer to the last set of non-black, temporally synchronized and matching two video frames of two video streams being compared. FIG. 5 illustrates a lower boundary 506-1 and an upper boundary 506-2.

Ad period detector 412 may detect a possible ad period. As used herein, the term "possible ad period" may refer to any portion of an interstitial bordered on two ends by either a porch, or the interstitial start or end. In addition, ad period detector may determine a valid ad duration, which is any acceptable range of time that might encompass an actual ad. For example, detector 412 may determine any period from 13.5 seconds, to 15.5 seconds as a valid duration for a 15 second ad.

Errant frame detector 414 may detect any image frame preceding the interstitial front porch or following the interstitial back porch as "errant frames," provided respective porches exist. FIG. 5 illustrates errant frames 508-1 through 508-3.

Fade detector 416 may determine a transition between black frames and image frames. Fade detector 416 may also determine the abruptness of the transition. Audio/Mute detector 418 may determine a period of silent audio as a mute period, based on the duration and relative temporal location of the period within the interstitial.

Figure 6:
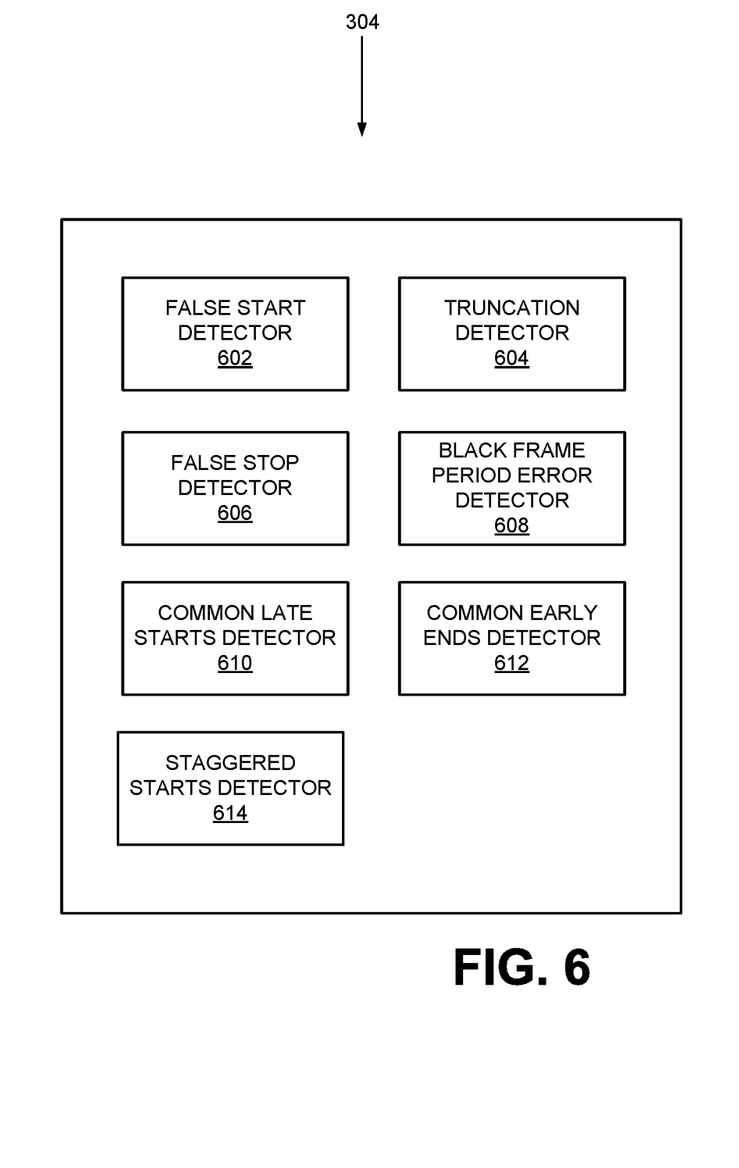
FIG. 6 illustrates exemplary functional components of the anomaly detector of FIG. 3.

FIG. 6 illustrates exemplary functional components of anomaly detector 304. As shown, anomaly detector 304 may include a false start detector 602, truncation detector 604, false stop detector 606, black frame period error detector 608, common late starts detector 610, common early ends detector 612, and staggered starts detector 614. Depending on the implementation, anomaly detector 304 may include additional, fewer, or different components than those illustrated in FIG. 6.

False start detector 602 may identify a false ad start. A false start results when the inserted ad begins excessively late, allowing a portion of the underlying ad (e.g., an ad that was present before being overwritten by the current ad) to briefly run before the inserted ad interrupts. They are characterized by possible ad periods defined by both front and back porches, and occurring entirely within a prescribed time (e.g., the first 3 seconds) after the beginning of an interstitial.

False start detector 602 may assign a high degree of confidence to a detected false start. Confidence (that a detected false start is correct) may increase inversely to the duration of the possible ad period; confidence may increase as the possible ad period nears a lower boundary; confidence may increase proportionately with the amount of motion associated with the first image frame of the possible ad period; and confidence may increase proportionately with the amount of motion associated with the first black frame of the back porch of the associated possible ad period. When false start detector 602 detects a false start, alert and alarm generator 306 always generates an alarm, with an instruction to advance an ad by a time equal to the sum of the front port porch duration and possible ad period.

Truncation detector 604 may identify truncated ads. A truncation occurs when ads fail to play for the appropriate time. In identifying a truncation, truncation detector 604 may remove, from the possible ad period, any portion of the interstitial described entirely by errant image frames. The remaining possible ad period is then concatenated with previous and successive contiguous sections of the interstitial: porches, errant image periods and other possible ad periods—until they cumulatively describe/define a valid ad duration, with at least the following provisions: (1) possible ad periods are used in their entirety; (2) front and back porches do not need to be used in their entirety unless encompassed by two possible ad periods; (3) no greater than N (e.g., N=30) contiguous black frames may be applied at the beginning or at the end of a valid ad period; and (4) collectively, no greater than M (e.g., M=45) cumulative black frames may be applied from both the beginning and end of a valid ad period.

Truncation detector 604 may classify any possible ad period that cannot be concatenated, under the above provisions, with other interstitial sections to define a valid ad period as truncated, even if the duration exceeds all acceptable ad durations. Truncation detector 604 may assign a moderate level of confidence, Truncations may be reported as alarms without a recommendation.

False stop detector 606 may identify a false stop that results when the inserted ad ends too early, allowing a portion of the underlying ad to briefly run after the inserted ad completes. A false stop may be characterized by a possible ad period with both front and back porches and occurring entirely within the final R (e.g., R=3) seconds of an interstitial.

Detector 606 may assign a high degree of confidence to a detected false stop. Confidence may increase inversely to the duration of the possible ad period; confidence may increase as the possible ad period nears an upper boundary; confidence may increase proportionately with the amount of motion associated with the first image frame of the possible ad period; and confidence may increase proportionately with the amount of motion associated with the first black frame of the back porch.

Detector 606 may assign/generate an alarm in response to detecting a false stop, informing that the ad ended early by the time duration equal to the sum of the possible ad period and the back porch. Detector 606 may not make any recommendation for action.

Black frame period error detector 608 may identify excessive black frames. A black frame period describes a period of contiguous black frames. Periods longer than a prescribed time duration (e.g., 2 seconds) and less than a threshold (e.g., 3 seconds) may be considered unlikely to be a legitimate portion of an advertisement and detector 608 may generate ad alerts. If the period of excessive black frames exceeds the threshold, detector 608 may generate an alarm. Detector 608 may assign a high degree of confidence to all periods of excessive black frames. Detector 608 may make no recommendations in reports identifying excessive black frames.

Common late starts detector 610 may identify an event that occurs when the ad insertion for two vides each begins sufficiently late that the underlying ads display similarly to a false start, but occurring for the two video streams at the same time. As the underlying ad is identical for both sources, analyzer 160 may not recognize an interstitial until the first insertion commences at one of the videos.

Common late starts detector 610 may indicate a common late starts by periods of contiguous black frames in the adjacent programming in each video stream, and within a predetermined time (e.g., 3 seconds) of the detected lower boundary.

Detector 610 may assign a low level of confidence to a detected common late starts. For detected common late starts, confidence may increase inversely to the distance of the starts from lower boundary; confidence may increase proportionately to the motion associated with the first black frame in the period of black frames; and confidence may increase proportionately to the motion associated with the first image frame after the period of black frames.

Detector 610 may report a common late starts with a confidence level beyond a specified threshold, with instructions to begin the ad by the difference between the lower boundary and the beginning of the black period within the adjacent programming.

Common early ends detector 612 may identify an event when inserted ads in video streams each end sufficiently early that the underlying ad displays similarly to a false stop, but occurring for the video streams at the same time.

Detector 612 may indicate a common early ends by periods of contiguous black frames in the adjacent programming within each video stream, and within a prescribed time (e.g., 3 seconds) of the upper boundary.

Detector 612 may assign a low level of confidence. For common early ends, confidence may increase inversely to the distance of the ends from the upper boundary; confidence may increase proportionately to the motion associated with the first black frame in the adjacent programming beyond the upper boundary; and confidence may increase proportionately to the motion associated with the first image frame after the period of black frames in the programming beyond the upper boundary.

If detector 612 determines that common early ends has a level of confidence beyond a specified threshold, detector 612 may report the early ends as an alarm, indicating that the ad ended early by the difference between the upper boundary and the end of the black period within the adjacent programming.

Staggered starts detector 614 may detect occurrence of events in which a program in one video stream begins and ends its interstitial earlier than the other. Two conditions must be present for detector 614 to determine that the event is a staggered starts: the presence of errant image frames against the lower boundary of a specified source interstitial, that persist until after the completion of the interstitial front porch on the other video stream; and the corresponding presence of errant image frames against the upper boundary of the alternate source interstitial, that commence earlier than the interstitial back porch of the specified video stream.

Detector 614 may assign a low level of confidence to a detected staggered starts. For staggered starts, confidence may increase with the number of errant image frames temporally in-board of the alternate video stream's interstitial front/back porch.

Figure 7:
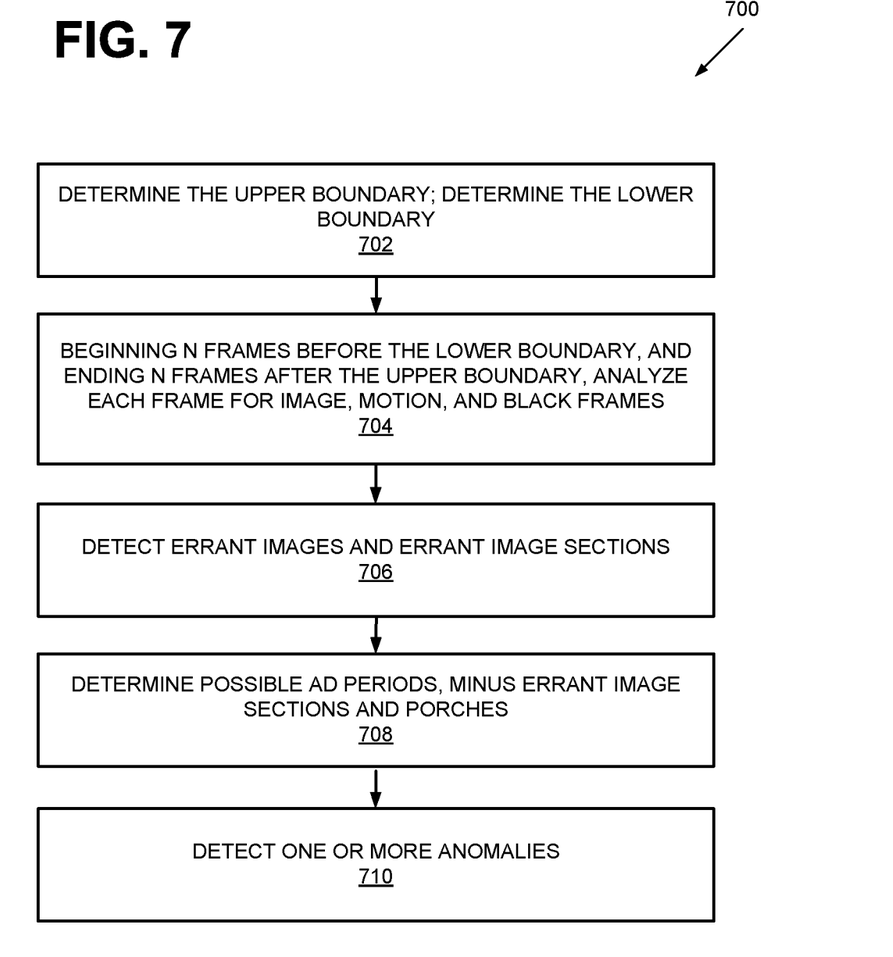
FIG. 7 illustrates an exemplary process that is associated with analyzing an exemplary interstitial.

FIG. 7 illustrates an exemplary process that is associated with analyzing an exemplary interstitial. As shown, process 700 may include, for each video stream/source, locating the upper boundary and the lower boundary (block 702). For example, analyzer 160 may apply boundary detector 410.

Process 700 may include, for each video stream/source, beginning N frames before the lower boundary and ending N frames (e.g., N=100) after the upper boundary, analyzing each frame for image, motion, and black frames. In one implementation, analyzing each frame for image, motion, and black frames may include using one or more components of analyzer 160 (see FIG. 4).

Process 700 may also include detecting errant images and errant image sections (an area occupied by errant images) near the upper and lower boundaries (block 706), and determining possible ad periods, minus errant image sections and porches (block 708).

Process 700 may further include detecting one or more anomalies (block 710). In some implementations, detecting the anomalies may follow the order in which the different types of anomalies are listed as follows: false starts; truncation; false stops; excessive black screen duration; common late starts; common early ends; and staggered starts, as described above.

Figure 8:
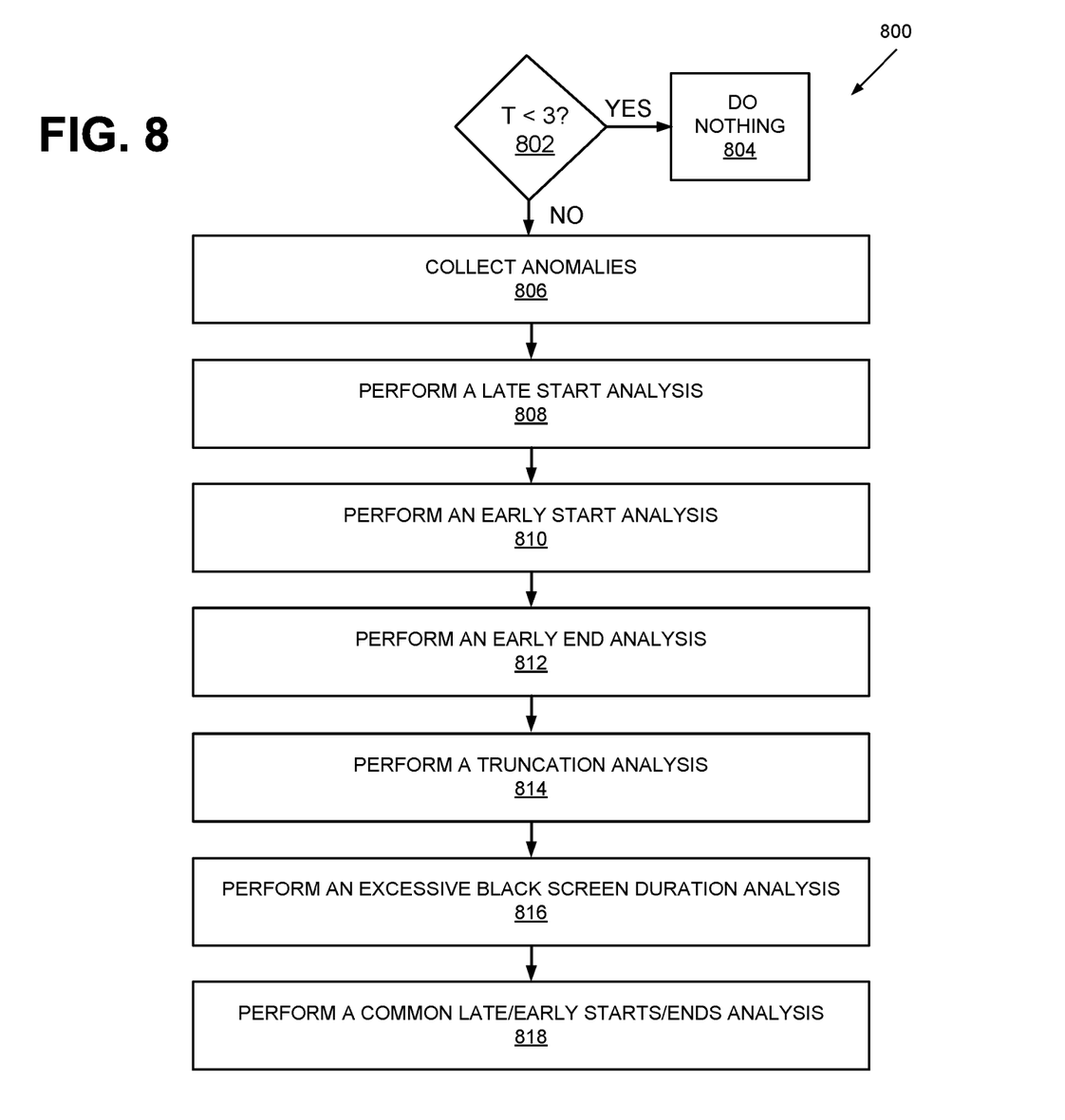
FIG. 8 illustrates an exemplary process that is associated with performing a multi-interstitial analysis.

FIG. 8 illustrates an exemplary process 800 that is associated with performing a multi-interstitial analysis. In some implementations, the analysis may be performed over multiple video streams/sources for a single channel.

Process 800 may initially determine whether there are more than three video interstitials to analyze or three reports on interstitials for a single program (block 802). If there are less than three (block 802: Yes), process 800 may do nothing or terminate further analysis (block 804). Otherwise (block 802: No), anomalies from all interstitials may be detected (block 806). In one implementation, to perform multi-interstitial analysis, analyzer 160 may collect reports on interstitials, and identify/collect all anomalies in the reports for the given program.

Process 800 may include performing a late start analysis (block 808). When performing the analysis, if the number of false starts>=the number of interstitials/2, and without any staggered early starts, then analyzer 160 may determine that the ad under analysis started late.

In addition, analyzer 160 may indicate (e.g., in a multi-interstitial report or in a communication to a user), to advance the ad start by the difference between the mean time of the lateness and the standard deviation of the lateness.

Process 800 may include performing an early start analysis (block 810). If the ad was not determined to have started late and if the number of early starts for the interstitials is greater than zero, then if the number of staggered early starts>=the number of interstitials divided by two, and also there is no detected false start (e.g., in the reports), then determine that the ad started early, and indicate/recommend that the ad be delayed by the difference between the mean of the time (by which the ad is early) and its standard deviation.

Process 800 may include performing an early end analysis (block 812). If the number of false stops (e.g., in the reports)>the number of interstitials divided by two, then report (or indicate to a user), that the ads ended early, by the difference between the mean time of the earliness and its standard deviation.

Process 800 may include performing truncation analysis (block 814). If the number of truncations (in the reports)>=the number of interstitials divided by five, then report (or indicate to a user) that there the ad has been truncated.

Process 800 may include performing excessive black screen duration analysis (block 816). If the number of detected incidence of excessive black frames>the number of interstitials divided by ten, indicate, in a report or in a communication to a user, that there is an excessive black frame duration. In addition, indicate that the duration is the mean time of excessive black frame duration minus its standard deviation.

Process 800 may further include performing common late starts and/or common early ends (block 818). If the number of common late starts>the number of interstitials divided by two, and also common early ends=0, then indicate (e.g., in a report or to a user) a possible common late start, by the mean time (of the lateness) minus their standard deviation.

If the number of common late starts<=the number of interstitials divided by two or common early ends is not equal to 0, then if the number of common early ends>the number of interstitials divided by two and the number of common late starts=0, then indicate a possible common early end, by the mean time (of the early ends) minus their standard deviation.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 7 and 8, the order of the blocks/actions may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A method comprising:
receiving a first video stream and a second video stream, wherein the first video stream and the second video stream are derived from an advertisement and program content;
comparing a first portion of the first video stream to a second portion of the second video stream;
detecting an advertisement in the first video stream and the second video stream based on the comparing;
identifying one or more anomalies in the advertisement; and
generating an alert or an alarm based on the one or more anomalies.

2. The method of claim 1, wherein receiving the first video stream includes:
   receiving the first video stream over a network;
   applying Motion Picture Experts Group (MPEG) encoding to the first video stream; and
   storing the first portion.

3. The method of claim 1, wherein detecting the advertisement includes detecting one or more of:
   an interstitial, black frames, front and back porches, upper and lower boundaries, possible ad periods, or errant frames.

4. The method of claim 3, wherein the front porch includes contiguous black frames occurring without audio, wherein the black frames immediately precede images frames of the interstitial, and wherein the black frames appear within a predetermined time window of a start or an end of the interstitial.

5. The method of claim 1, further comprising:
   when the one or more anomalies are detected, determining a confidence level for each of the one or more anomalies; and wherein generating the alert or the alarm includes:
   generating the alert or the alarm based on the one or more anomalies when the confidence level of the anomaly is greater than a threshold.

6. The method of claim 1, wherein each of the one or more anomalies includes one of:
   a false start, a truncation, a false stop, a black frame period error, a common late starts, a common early ends, or a staggered starts.

7. The method of claim 6, wherein the false start indicates beginning the advertisement late, within the first video stream, and wherein the first portion includes part of an underlying advertisement, in the first portion, that has not been overwritten by the advertisement.

8. The method of claim 1, wherein identifying one or more anomalies includes:
   performing a multi-interstitial analysis, wherein the number of interstitials is greater than three, wherein the multi-interstitial analysis includes performing at least one of:
   an early start analysis;
   an early end analysis;
   a truncation analysis;
   an excessive black screen duration analysis; or
   a common late starts or early ends analysis.

9. The method of claim 8, wherein the early start analysis includes:
   when the advertisement has not started late, when a number of early starts for the interstitials is greater than zero, when a number of staggered early starts greater than greater than or equal to a number of the interstitials divided by two, and when there is no detected false start for the interstitials, determining that the advertisement started early.

10. The method of claim 8, wherein the excessive black screen duration analysis includes:
    when a number of detected incidence of excessive black frames for the interstitials is greater than a number of the interstitials divided by ten, indicating that there is an excessive black frame duration.

11. A system comprising:
    a first recorder that receives a first video stream;
    a second recorder that receives the second video stream, wherein the first video stream and the second video stream are derived from an advertisement and program content;
    a comparator that:
       compares a first portion of the first video stream to a second portion of the second video stream; and
       detects an advertisement in the first and second video streams based on comparing the first portion and the second portion; and
    an analyzer that:
       identifies one or more anomalies in the advertisement; and
       generates an alert or an alarm based on the one or more anomalies.

12. The system of claim 11, further comprising:
    Motion Picture Experts Group (MPEG) encoder that receives the first video stream and provides an encoded first video stream to be recorded.

13. The system of claim 11, wherein when the comparator detects the advertisement, the analyzer is further configured to detect one or more of:
    an interstitial, black frames, motion frames, front and back porches, upper and lower boundaries, possible ad periods, or errant frames.

14. The system of claim 13, wherein the front porch includes contiguous black frames, occurring without audio, immediately preceding images frames of the interstitial, and wherein the black frames appear within a predetermined time interval of the start or the end of the interstitial.

15. The system of claim 11, wherein the analyzer is configured to:
    when the analyzer detects the one or more anomalies, determine a confidence level for each of the one or more anomalies; and wherein when the analyzer generates the alert or the alarm, the analyzer is configured to:
    generate the alert or the alarm based on the one or more anomalies when the confidence level of the anomaly is greater than a threshold.

16. The system of claim 15, wherein each of the one or more anomalies includes one of:
    a false start, a truncation, a false stop, a black frame period error, a common late starts, a common early ends, or a staggered starts.

17. The system of claim 16, wherein the false start includes beginning the advertisement late, within the first video and results in a portion of the underlying advertisement that has not been overwritten by the advertisement.

18. A non-transitory computer-readable medium comprising computer-executable instructions, which when executed by one or more processors, cause the one or more processors to:
    receive a first video stream and a second video stream, wherein the first video stream and the second video stream are derived from an advertisement and program content;
    compare a first portion of the first video stream to a second portion of the second video stream;
    detect an advertisement in the first and second video streams based on the comparing;
    identify one or more anomalies in the advertisement; and
    generate an alert or an alarm based on the one or more anomalies.

19. The computer-readable medium of claim 18, wherein when the one or more processors receive the first video stream, the one or more processors are configured to:
- receive the first video stream over a network;
- apply Motion Picture Experts Group (MPEG) encoding to the first video stream; and
- store the first portion.

20. The computer-readable medium of claim 18, wherein when the one or more processors detect the advertisement, the one or more processors are configured to detect one or more of:
- an interstitial, black frames, front and back porches, upper and lower boundaries, possible ad periods, or errant frames.

* * * * *